(12) United States Patent
Baumgarten et al.

(10) Patent No.: US 9,155,249 B2
(45) Date of Patent: Oct. 13, 2015

(54) COMBINE HARVESTER COMPRISING AN AXIAL SEPARATING DEVICE AND METHOD FOR OPERATING A COMBINE HARVESTER

(75) Inventors: Joachim Baumgarten, Bellen (DE); Andreas Diekamp, Salzbergen (DE); Bernd Holtmann, Sendenhorst (DE); Rainer Bellmann, Harsewinkel (DE); Christoph Heitmann, Warendorf (DE); Axel Schroeder, Guetersloh (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 489 days.

(21) Appl. No.: 13/525,689

(22) Filed: Jun. 18, 2012

(65) Prior Publication Data

US 2012/0322521 A1  Dec. 20, 2012

(30) Foreign Application Priority Data

Jun. 20, 2011 (DE) .......................... 10 2011 051 215

(51) Int. Cl.
*A01F 12/28* (2006.01)
*A01D 75/28* (2006.01)
*A01D 41/127* (2006.01)

(52) U.S. Cl.
CPC .......... *A01D 75/282* (2013.01); *A01D 41/1276* (2013.01); *A01F 12/28* (2013.01)

(58) Field of Classification Search
USPC ................ 460/1, 4–6, 8–11, 62, 66, 107–110
See application file for complete search history.

(56) References Cited

U.S. PATENT DOCUMENTS

| 3,512,535 | A | * | 5/1970 | Coene ........................... 460/108 |
| 4,875,891 | A | * | 10/1989 | Turner et al. .................. 460/110 |
| 6,802,771 | B2 | | 10/2004 | Schwersmann et al. |
| 6,932,697 | B2 | * | 8/2005 | Baumgarten et al. ............. 460/1 |
| 7,771,260 | B2 | * | 8/2010 | Ricketts et al. .................... 460/9 |
| 2005/0176483 | A1 | * | 8/2005 | Schenk .......................... 460/106 |
| 2007/0178951 | A1 | * | 8/2007 | Voss et al. ..................... 460/109 |
| 2010/0009732 | A1 | * | 1/2010 | Lobdell et al. ................. 460/101 |

FOREIGN PATENT DOCUMENTS

| EP | 1 284 098 | | 2/2003 |
| EP | 1474964 | A1 * | 11/2004 |

* cited by examiner

*Primary Examiner* — Alicia Torres
(74) *Attorney, Agent, or Firm* — Michael J. Striker

(57) ABSTRACT

A combine harvester operates with an axial separating device for separating a crop flow picked up by the combine harvester into a plurality of partial flows. A partial flow composed of grain and non-grain components is fed by a separation surface of the axial separating device to a cleaning unit disposed downstream. The axial separating device is configured to manipulate a local concentration gradient of the partial flow that is output by the axial separating device caused by a tilt of the combine harvester. The extent of the manipulation is controlled individually depending on the tilt of the combine harvester.

4 Claims, 9 Drawing Sheets

Plane

Incline < 2°

2° < incline < 4°

4° < incline < 6°

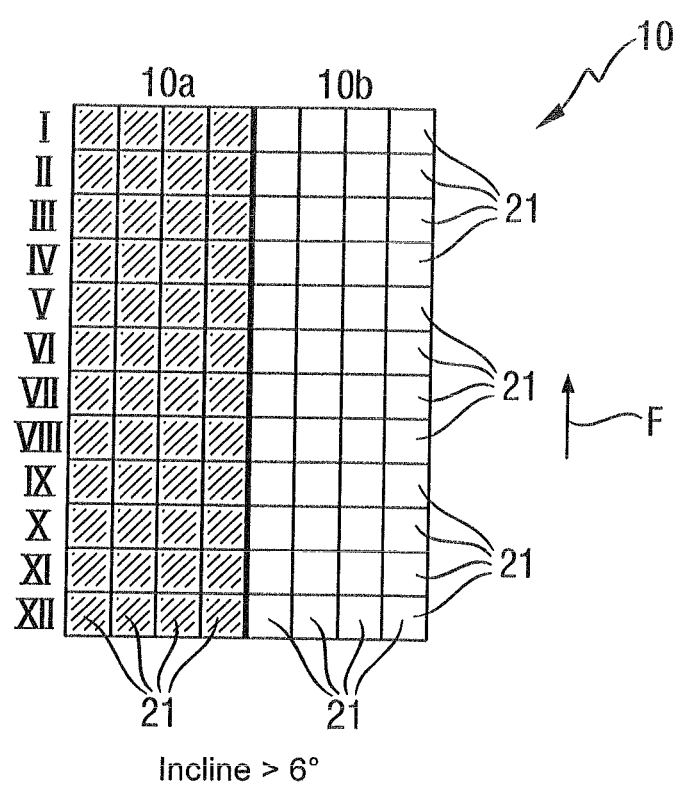

COMBINE HARVESTER COMPRISING AN AXIAL SEPARATING DEVICE AND METHOD FOR OPERATING A COMBINE HARVESTER

CROSS-REFERENCE TO A RELATED APPLICATION

The invention described and claimed hereinbelow is also described in German Patent Application DE 10 2011 051215.2, filed on Jun. 20, 2011. The German Patent Application, whose subject matter is incorporated by reference herein, provides the basis for a claim of priority of invention under 35 U.S.C. 119(a)-(d).

BACKGROUND OF THE INVENTION

The invention relates to a combine harvester comprising an axial separating device for separating a crop flow picked up by the combine harvester into a plurality of partial flows, the axial separating device including means for manipulating a local concentration gradient of a partial flow output caused by the tilt of the combine harvester and method for operating thereof.

Combine harvesters comprising an axial separating device for separating a crop flow picked up by the combine harvester into a plurality of partial flows, where a partial flow composed of grain and non-grain components is fed by way of a separation surface of the axial separating device to a cleaning unit disposed downstream thereof are known. In harvesting processes that take place in a plane, a substantially uniform output of the partial flow from the axial separating device becomes established. Consequently, downstream devices such as the cleaning device are likewise loaded with crop in a uniform manner. But when harvesting is performed on a sloped hillside, the force of gravity causes harvested crop to accumulate on the downhill side when transferred from the header into the feed rake, while the concentration of crop decreases on the uphill side. This results in a crop local concentration gradient forms. This crop local concentration gradient continues as processing takes place within the combine harvester and continuously increases.

EP 1 284 098 A1 makes known a combine harvester of the initially mentioned type, which comprises an axial separating rotor for separating a crop flow into a plurality of partial flows. The partial flows contain the useful material and waste material in different concentrations. A cleaning unit is disposed downstream of the axial separating rotor, to which a partial flow composed of grain and non-grain components is fed in order to separate them from each other. The axial separating rotor is enclosed by a separation surface, which is formed of wire crating and comprises two sections having a plurality of openings. The separation surface of the axial separating rotor, which is subdivided into the two sections, comprises, in the first, upstream section thereof, a plurality of plates staggered in the circumferential direction, while the second section is formed only of wire grating in the conventional manner.

Each of the plates of the first section is pivotable about an axis that is parallel to the longitudinal axis of the axial separating rotor. To this end, the plates are mechanically coupled to one another in order to influence their pivot setting by way of a common linear actuator. To ensure that the portion of non-grain components in the partial flow output by the axial separating rotor remains small, the first section of the separation surface is closed in the crop-inlet region starting in the upstream direction in order to obtain an accumulation of grain in the outer region of the crop circulating in the axial separating rotor. The shifting of the earliest separation region in the upstream direction is controlled depending on the quantity of waste material that is separated out by way of the partial flow of useful material.

The aforementioned axial separating rotor significantly increases performance during harvesting travel in the plane, under certain harvesting conditions. But if the combine harvester begins to tilt transversely to the conveyance direction, for example, during travel along an incline, the local concentration of the partial flow output by the axial separating rotor increases on the downhill side. This occurs because the load in the header is greater on the downhill side due to the force of gravity, and therefore the separation thereof on the input side results in an additional loading of a cleaning unit disposed downstream of the axial separating rotor. The performance of the combine harvester on the sloped hillside therefore decreases.

SUMMARY OF THE INVENTION

The present invention provides an axial separating device, agricultural harvesting machine including the axial separating device and method of operation thereof that overcome shortcomings of the known arts.

To that end, the invention provides a combine harvester comprising at least one axial separating device, in which the performance level is raised to approximately that which can be achieved on a plane if the combine harvester should begin to tilt.

The invention also provides a method for operating a combine harvester that makes it possible to increase the performance level to approximately the level of performance that can be achieved in a plane.

In an embodiment, means are provided for manipulating a local concentration gradient of the partial flow that is composed of grain and non-grain components output by the axial separating device caused by the tilt of the combine harvester. The means is/are individually controllable depending on the tilt of the combine harvester. As a result, the concentration gradient of the partial flow between the downhill side and the uphill side can be evened out, thereby evening out the load on the downstream cleaning unit and improving the performance.

Preferably, the means actively even out the concentration gradient of the partial flow between the downhill side and the uphill side. In so doing, separation of the partial flow on the downhill side is at least reduced, while separation on the uphill side is favored.

In an embodiment, the means embody flaps for varying the passability of openings of the axial separating device individually, where the axial separating device is enclosed, at least in sections, by a separation surface, the separation surface comprising at least two sections. Since the effective separation surface is reduced on the downhill side by varying the passability, the output point of the partial flow is shifted from the downhill side toward the uphill side, thereby evening out the load on the cleaning unit.

To this end, the passability of the particular section of the separation surface can be varied in the circumferential direction and the longitudinal direction. The passability of the separation surface can therefore be selected to be lower on the downhill side as viewed in the conveyance direction of the axial separating device than in an uphill section of the axial separating device. As a result, the local concentration of the partial flow on the cleaning device, which decreases in accordance with the tilt of the axial separating device, is taken into account, thereby making it necessary to shift the output point in the uphill direction depending on the tilt with respect to the downhill or uphill position of the axial separating device. The flaps facing downhill are hinge-mounted in order to reduce or completely obstruct the passability of the particular section of the separation surface in the circumferential and longitudinal directions. The uphill flaps are moved into a partially or fully opened position and are held there.

In an embodiment, the means is formed as a plurality of guide elements. The guide elements are distributed in the circumferential direction underneath a separation surface enclosing the axial separating device, the positions of which can be varied individually with respect to the separation surface. The guide elements can be adjusted against the tilt direction of the combine harvester to at least reduce a downhill separation by reducing the passability of this section of the separation surface, thereby favoring the uphill separation.

In an embodiment, the means is formed as plate-shaped flaps that can be pivoted about pivot axes located on both sides of the axial separating device and disposed axially parallel thereto. The plate-shaped flaps can be pivoted in such a way that, by way of the front edge thereof, they adjoin the axial separating device, where they form a chamber between same and a wall on which the pivot axis is disposed. The filling of the chamber shifts the point at which the partial flow emerges in the uphill direction as viewed in the conveyance direction, thereby making it possible to even out the output of the axial separating device.

In an embodiment, the means is formed of at least one rotationally driven spreading roller disposed on both sides of the axial separating device and arranged axially parallel thereto. The spreading roller preferably comprises a substantially star-shaped cross section and is pivotably supported at walls that laterally delimit the axial separating device in the output region of the axial separating device. Preferably, one spreading roller is disposed adjacent to each separating grate in each case, and extends across the width thereof. The spreading rollers are rotationally driven against the conveyance direction of the axial separating device.

The rotational speed of the at least one spreading roller can be changed depending on the tilt. The spreading width can therefore be directly influenced from the downhill side to the uphill side.

Preferably, the means is actuated pneumatically. Pneumatic actuation of the means has the advantage that the means respond more rapidly compared to hydraulically actuated means. This ability to react rapidly makes it possible to adapt the passability of the particular sections of the separation surface more rapidly to changing local concentrations of the partial flow output by the axial separating device. A further advantage is that the risk of blockage is prevented because closing takes place more rapidly in the case of pneumatic actuation.

In a further embodiment, the means is formed as guide plates. The guide plates are disposed on a return pan disposed underneath the axial separating device in such a way that they can pivot about an axis that is axially parallel to the axial separating device. In this embodiment as well, the guide plates on the return pan are actuated against the tilt direction in order to even out the concentration of the partial flow output at the return pan. The partial flow is subsequently delivered from the return pan to the cleaning unit. More particularly, the position of each guide plate can be varied individually relative to the surface of the return pan.

The invention provides a method for operating a combine harvester comprising an axial separating device for separating a crop flow taken up by the combine harvester into a plurality of partial flows, where one partial flow is fed by way of a separation surface to the axial separating device (which comprises a plurality of sections), to a cleaning unit disposed downstream thereof. The partial flow output by the axial separating device to the cleaning device is manipulated by means that are controlled individually depending on a tilt of the combine harvester. The local concentration gradient that forms between an uphill side and a downhill side due to the tilt of the combine harvester as the partial flow is output by the axial separating device is thereby evened out.

To this end, the sections of the separation surface facing downhill can be closed at least partially depending on a transverse tilt of the combine harvester that is detected and the passability of the separation surface can be reduced in the radial direction as the distance from the inlet region of the axial separating device increases.

Preferably, at least one signal that represents the concentration of useful material in one of the partial flows emerging from the axial separating device is detected by a sensor system. The detected signal is used to vary the passability of the sections independently of one another. To improve the accuracy of the control, in addition to detecting a lateral tilt of the combine harvester by way of a suitable tilt sensor, the invention detects the loss portion of the useful material separated out by the axial separating device.

Alternatively or in addition thereto, at least one signal that represents the concentration of useful material in a partial flow emerging from a cleaning unit disposed downstream of the axial separating device is detected by a sensor system. The signal is used to vary the passability of the sections independently of one another.

Moreover, at least one signal that represents the concentration of useful material in a partial flow fed to tailings is detected by a sensor system. The signal is used to vary the passability of the sections independently of one another.

BRIEF DESCRIPTION OF THE DRAWING FIGURES

Further features and advantages of the invention will become apparent from the description of embodiments that follows, with reference to the attached figures, wherein:

FIG. 1 a schematic depiction of a combine harvester, in a side view;

FIGS. 3a-3e is a schematic depiction of possible flap positions of the FIG. 2 axial separating device;

Figure 4:
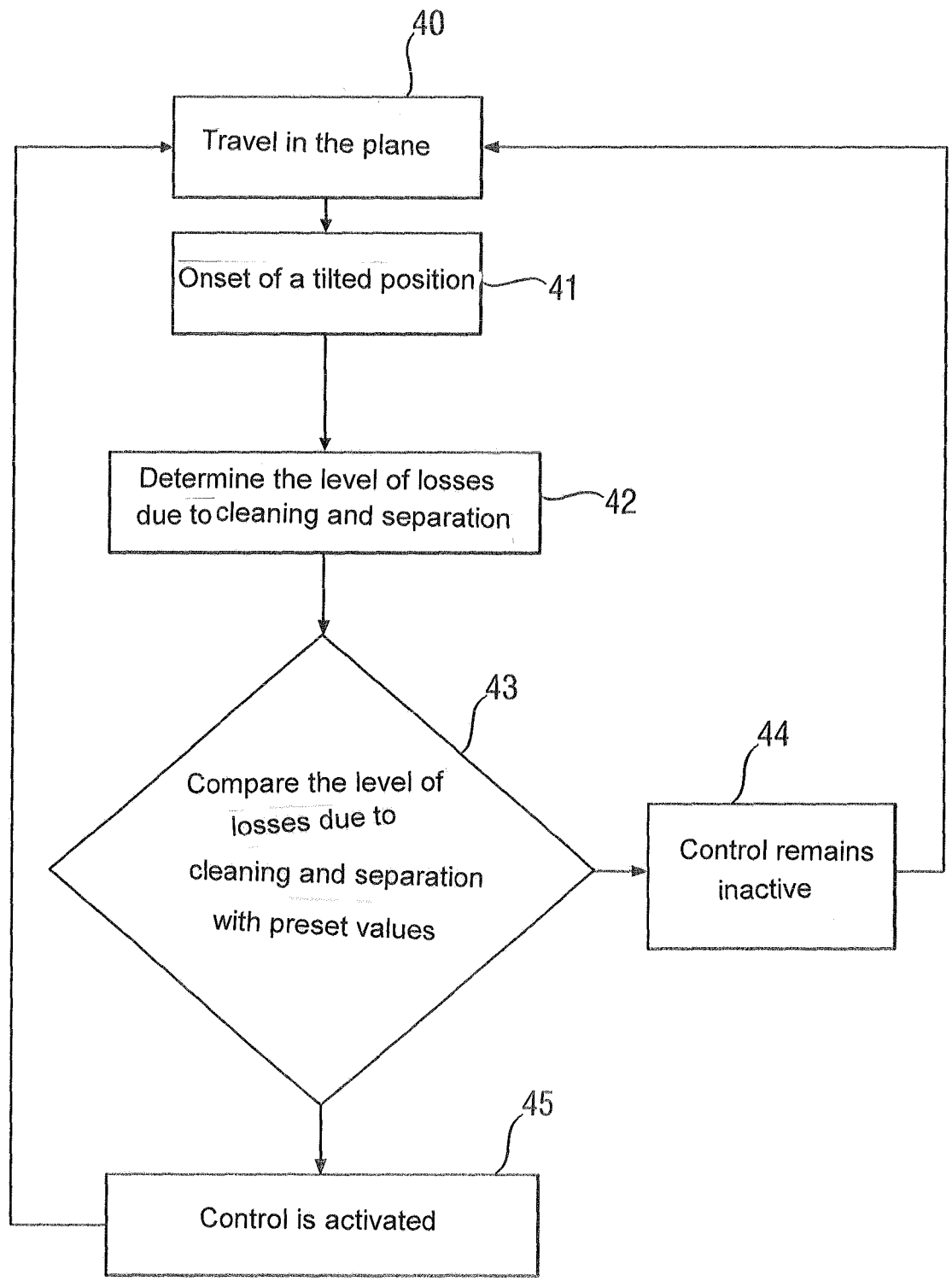
Figure 5:
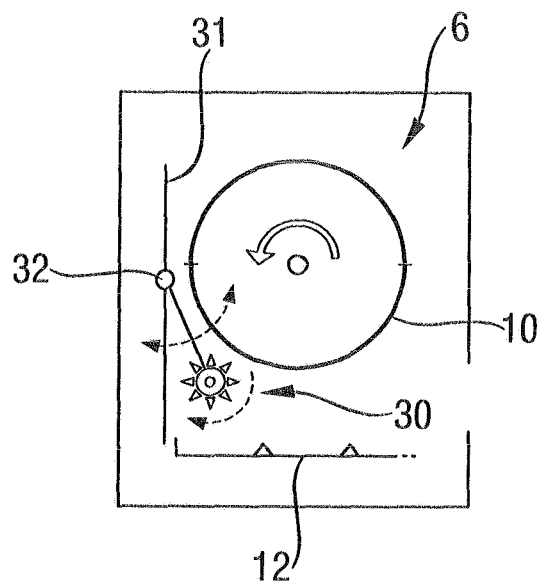
Figure 6:
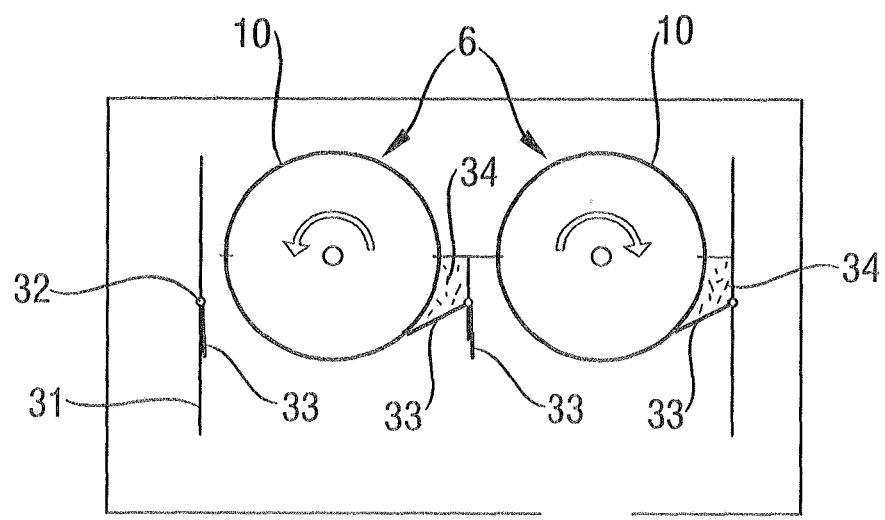
Figure 7:
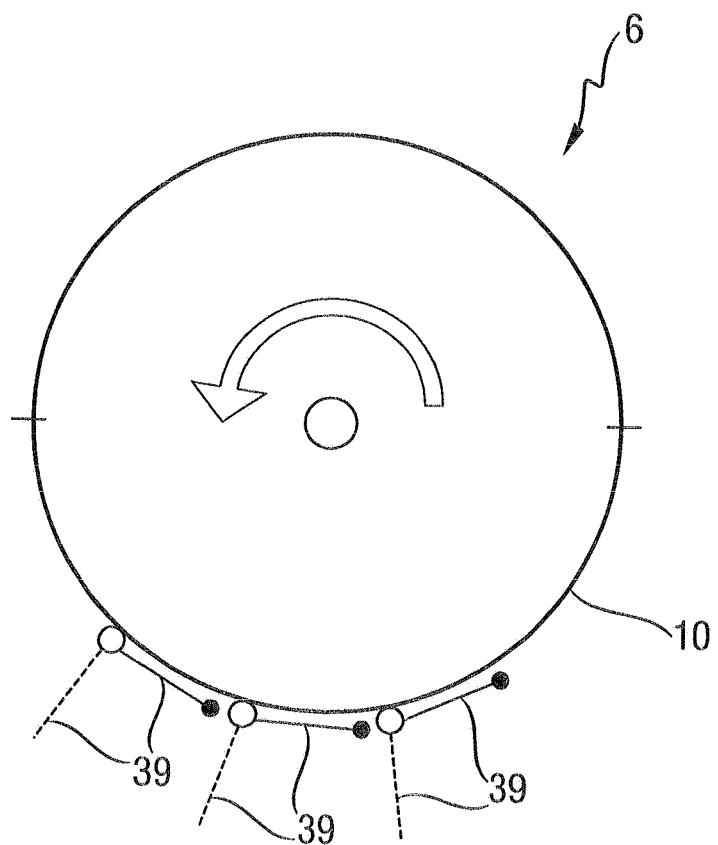
Figure 8:
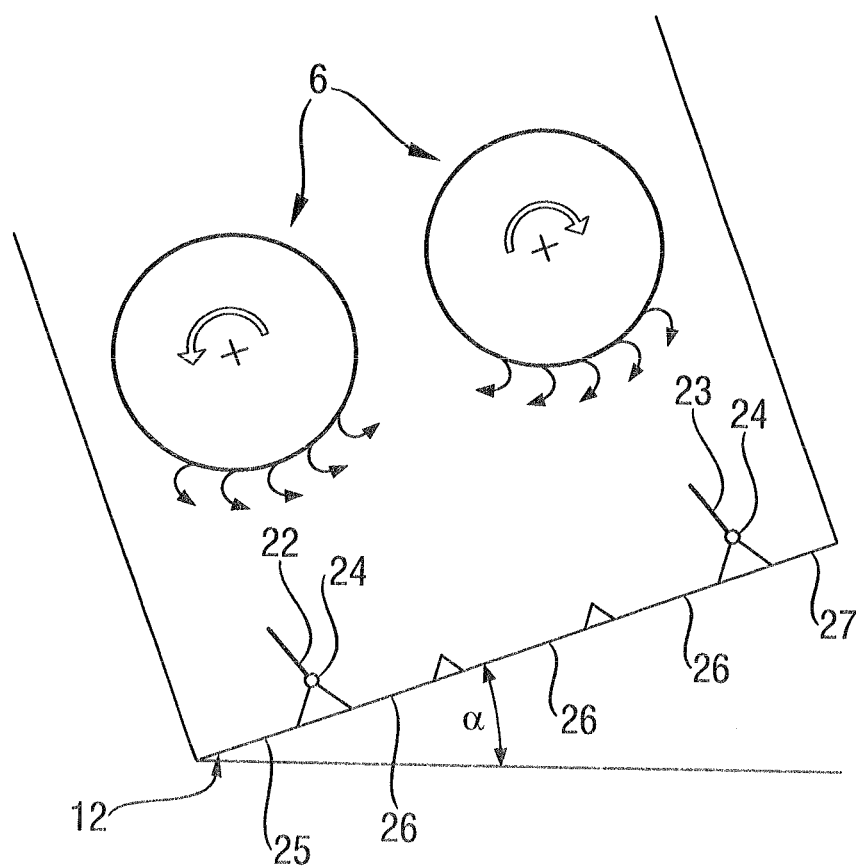

FIG. 4 a flow chart for illustrating a control method of the invention;

FIG. 5 depicts and embodiment of an axial separating device comprising spreading rollers disposed on both sides of the axial separating device;

FIG. 6 depicts an embodiment of an axial separating device comprising flaps disposed on both sides of the axial separating device;

FIG. 7 depicts an embodiment of an axial separating device comprising guide elements disposed in the circumferential direction; and FIG. 8 depicts a return pan disposed downstream of the axial separating device, on which guide plates are disposed.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
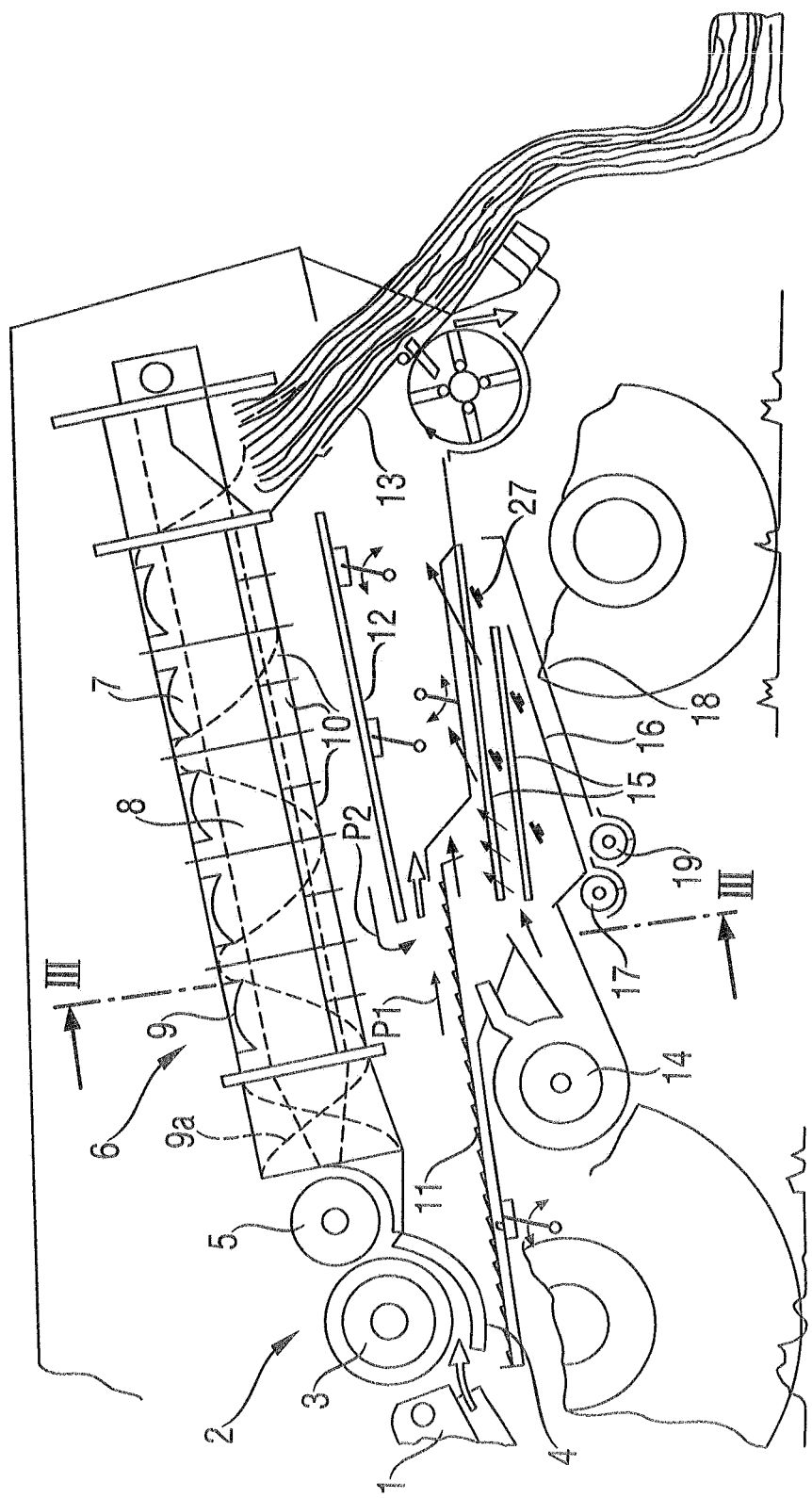

FIG. 1 depicts a schematic longitudinal view of the rear region of a combine harvester. Crop to be processed is taken up in the front region of the combine harvester (which is not shown) and is fed by a conveyance device 1 (which is depicted only in part) to a tangentially acting threshing unit 2. The threshing unit 2 comprises a cylinder 3 having an axis that is oriented transversely to the direction of travel of the combine harvester. The threshing unit 2 is equipped on the outer jacket thereof with rasp elements and is enclosed around a portion of the circumference thereof by a concave 4. A partial flow of the crop processed by the threshing unit 2 passes through openings in the concave 4 and reaches a grain pan 11 on which it is conveyed against the direction of travel of the combine harvester (indicated by arrow P1), by way of oscillating motions.

However, a larger partial flow of the crop is conveyed between the cylinder 3 and the concave 4 and, with assistance from a guide cylinder 5, is fed to an axial separating device 6. The schematically depicted axial separating device 6 is in the form of at least one cylindrical housing 7. The cylindrical housing 7 is open at the ends thereof, and a feed device 8 is supported across the entire length thereof in a rotationally drivable manner. By way of the rotation of the feed device 8, the crop is conveyed on a helical trajectory through the axial separating device 6. Kneading of the crop is promoted by ribs 9 projecting from a top side of the housing 8 into the interior thereof when the outer edge of the helix 9a of the feed device 8 moves past them.

The conveying speed is influenced by way of the rotational speed of the feed device 8. As the rotational speed of the feed device 8 increases, the conveying speed as well as the centrifugal force increase and, therefore, the forces acting on the useful material that causes the separation thereof. At the same time, however, the retention time of the crop in the axial separating device 6 decreases. The lower region of the housing 7 is formed by separating grates 10, which comprise openings 21 for the passage of crop, as depicted schematically in FIG. 2.

The components of the partial flow output by the axial separating device, namely grain, chaff and fine straw, that are slung out of the axial separating device 6 through the openings 21 of the separating grates 10, drop onto a grain pan 11 or return pan 12 disposed underneath. The grain pan 11 and the return pan 12 are driven in an oscillating manner to convey material collected thereon in the direction of travel of the combine harvester, as indicated by arrows P1, P2. The crop on the return pan 12 is transferred to the grain pan 11 and joins the grain that has already been separated out in the threshing unit 2, thereby forming a material flow, which is referred to herein as pre-cleaned straw.

The coarse straw, from which grain has been removed to the greatest extent possible during passage through the axial separating device 6, is ejected at the rear end of the axial separating device 6 and drops through a chute 13 onto the ground. The threshing unit 2 and the axial separating device 6 therefore form a first separating stage, which delivers the pre-cleaned flow and a first waste material flow composed of the threshed-out straw.

A second separating stage or cleaning stage substantially comprises a blower 14 and a group of perforated floors 15 lying in the airflow of the blower. The perforated floors 15 are driven in an oscillating manner by a frame structure (not shown) and loaded with the pre-cleaned partial flow. The grain contained in the pre-cleaned partial flow drops through the oscillating perforated floors 15 onto a slanted first guide pan 16. A conveyor auger 17 is disposed at the lower end of the guide pan 16, which conveys the grain to an elevator (not shown) and, by way thereof, into a grain tank (not shown).

Lightweight components of the pre-cleaned flow are carried away by the airflow of the blower 14 during sifting, and are separated out as a second waste flow onto the ground. Components of the pre-cleaned straw that have passed over the entire length of the perforated floors 15 without having been sifted out or carried away by the blower airflow finally drop onto a second slanted guide pan 18 and are conveyed by a feed auger 19 disposed at the lower end thereof back to the threshing unit 2 or to the separating device 6 in order to pass therethrough once more.

If the combine harvester tilts to the side, which can occur on a sloped hillside, the crop is distributed unevenly, due to the force of gravity, across the width of the grain pan 11, the return pan 12 and the perforated floors 15. The uneven distribution is intensified by the driving of the grain pan 11, the return pan 12 and the perforated floors 15 in an oscillating manner. Every stroke, therefore, causes crop located on the pans 11, 12, 15 to move further downhill, transversely to the conveyance direction, where an unwanted local concentration of the crop occurs.

To compensate for this effect, means are provided for manipulating a local concentration gradient of the first partial flow that is output by the axial separating device 6 to the cleaning device caused by the tilt of the combine harvester to the side in particular. The means is/are controllable individually depending on the tilt of the combine harvester. In an embodiment, the means is provided in the form of flaps 20, by way of which the passability of the openings 21 of the axial separating device 6 is varied individually. The axial separating device is enclosed, at least in sections, by a separation surface, which comprises at least two sections 10.

Figure 2:
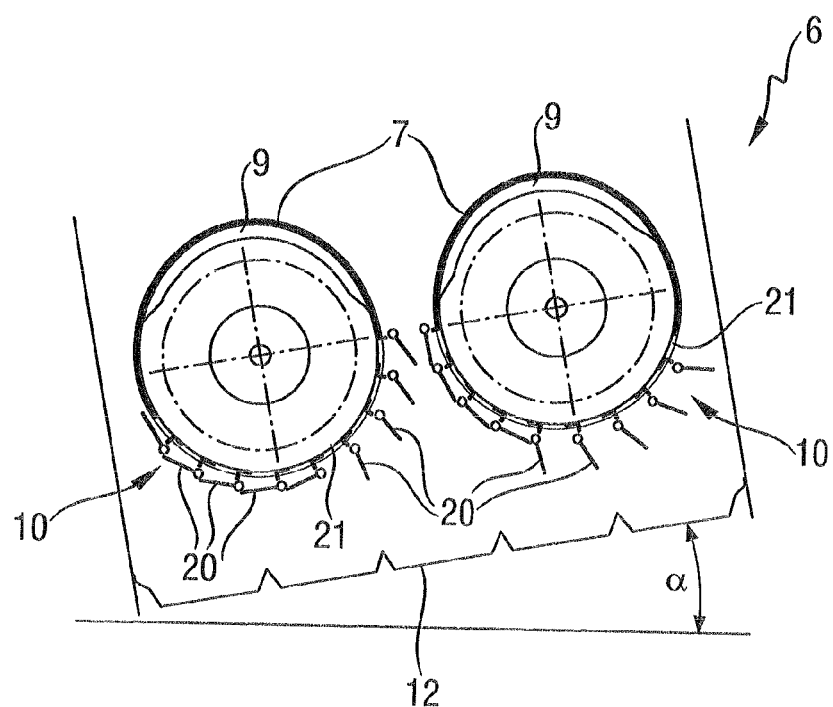
FIG. 2 depicts an embodiment of an axial separating device comprising flaps, which are distributed in the circumferential direction.

FIG. 2 shows a schematic cross-sectional view of the axial separating device 6 of the combine harvester in a position that is tilted with respect to the horizontal by an angle α. To obtain the above-described effect, the positions of the flaps 20 are controlled individually, thereby increasing the output of crop flow on the uphill side.

FIGS. 3a to 3e show, in a schematic depiction, a view of an unwound separating grate 10 according to FIG. 2, from above, on the basis of which the individual control of the flaps 20 is illustrated. The conveyance direction of the crop in the interior of the axial separating device 6 is indicated by an arrow F. As the distance to the inlet region of the axial separating device 6 increases, the number of openings 21 of the particular separating grate 10, through which the crop can exit, changes, wherein this variation is varied not only in the longitudinal direction of the axial separating device 6 but also in the radial direction of each separating grate 10. Each separating grate 10 comprises a plurality of grate rows I, to XII, represented by a square. The passability of the openings 21 is variable. In the embodiment shown, twelve grate rows I to XII are shown, each thereof comprising eight openings 21. The particular number thereof was selected at random, for exemplary purposes only.

Figure 3A:
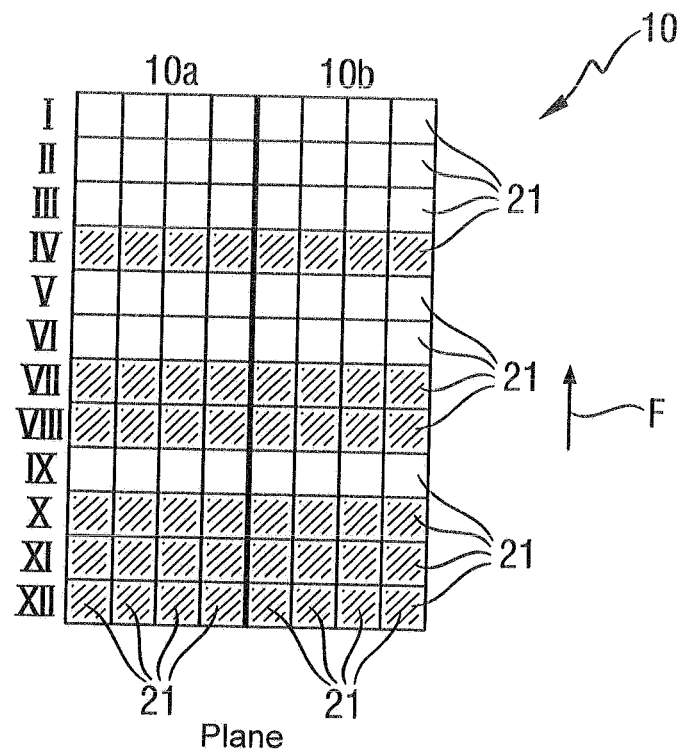

FIG. 3a shows the setting of the flaps 20 at the separating grate 10 during harvesting travel of the combine harvester in the plane. Every grate row I to XII is divided into a downhill region 10A and an uphill region 10B, both of which can be controlled individually. The openings 21 of the grate rows IV, VII and VIII, X, XI and XII are therefore closed in the downhill region 10A and in the uphill region 10B, as indicated by shading. The flaps 20 of the remaining grate regions are shown in the open position, as indicated by the absence of shading. These settings are determined by the operator of the combine harvester, as explained further below.

Figure 3B:
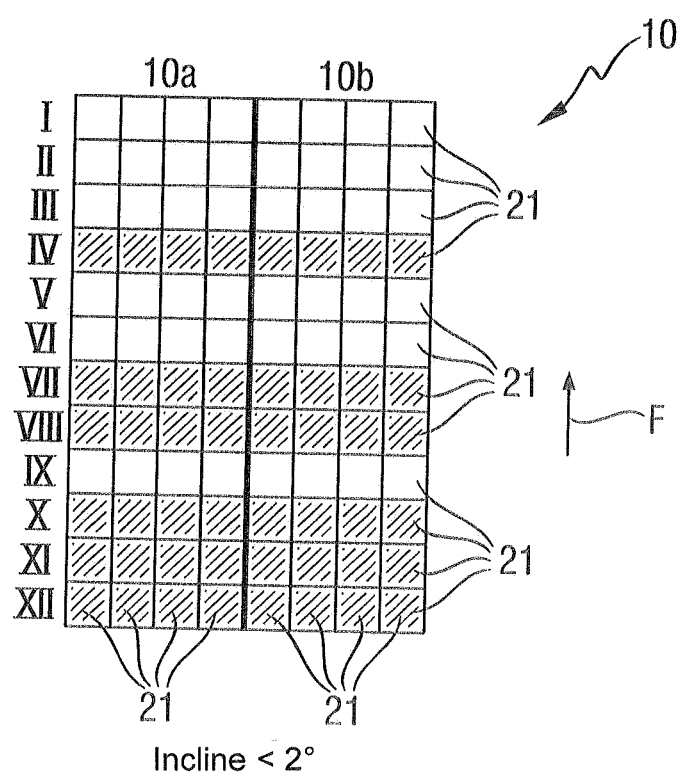

FIG. 3b shows the setting of the flaps 20 at the separating grate 10 during harvesting travel of the combine harvester on a slope of less than 2°. In the present case, the setting does not differ from that in the plane. A deviation therefrom can occur if the load on the cleaning unit is already high during harvesting travel in the plane. In that case, additional grate rows would be closed first in the downhill region 10A.

Figure 3C:
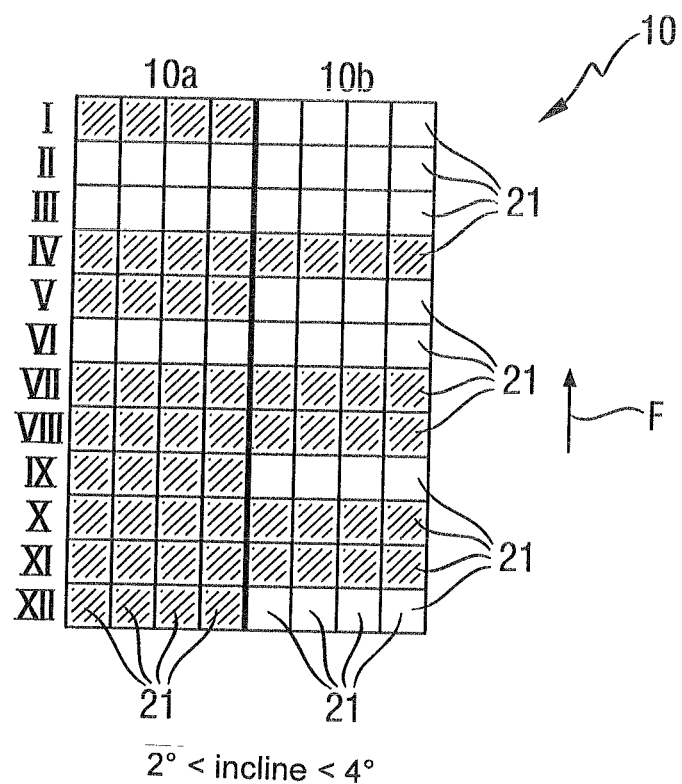

FIG. 3c shows the setting of the flaps 20 at the separating grate 10 during harvesting travel of the combine harvester on a slope between 2° and less than 4°. In this setting, the grate rows I, IV, V and VII to XII in the downhill region 10A are closed. In the uphill region 10B, however, only the grate rows IV, VII, VIII and X and XI are closed.

Figure 3D:
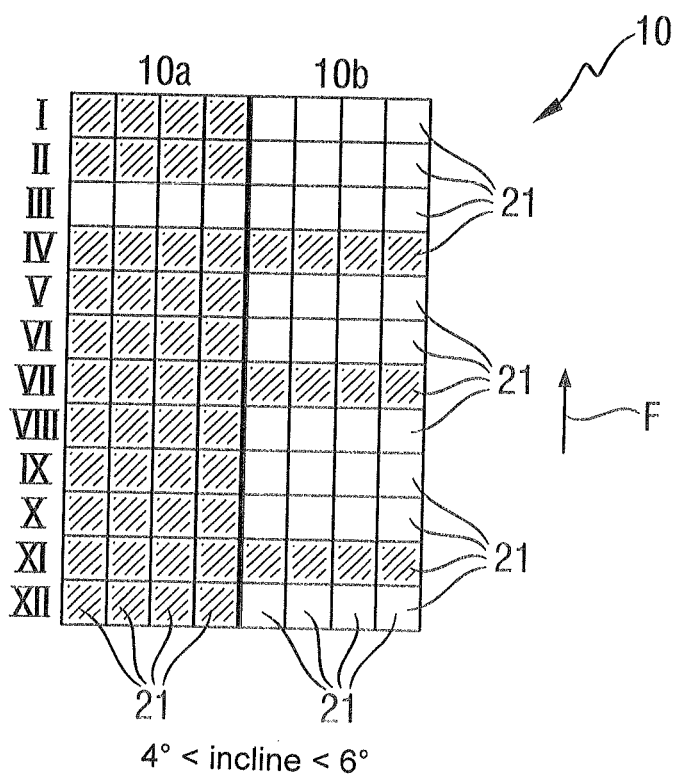

FIG. 3d shows the setting of the flaps 20 at the separating grate 10 during harvesting travel of the combine harvester on a slope between 4° and less than 6°. As the slope increases, additional flaps 20 are closed in the downhill region 10A. Hence, only the grate row III is open in the example shown. Additional grate rows are open in the uphill region, however, and so only grate rows IV, VII and X are closed. As a result, the partial flow is redistributed, wherein the cleaning unit is loaded on the uphill side with a larger quantity of chaff. The resulting additional load on the cleaning unit is much less as compared directly to the load on the cleaning unit without the flaps 20 being controlled.

FIG. 3e shows the setting of the flaps 20 at the separating grate 10 during harvesting travel of the combine harvester on a slope greater than 6°. In the downhill region 10A, all grate rows I to XII are closed, while, in the uphill region 10B, all grate rows I to XII are open to greatly relieve the cleaning unit on the downhill side thereof.

FIG. 4 presents a flow chart that serves to explain the control method on which the method for operating the combine harvester 1 according to the invention is based. Reference sign 40 indicates a starting position of the settings of the combine harvester during harvesting travel in the plane. The operator of the combine harvester enters basic settings for the harvesting travel, which influence, inter alia, the separation behavior of the separating device 6. In so doing, the operator defines values for the particular level of losses due to separation and losses due to cleaning that he deems acceptable. By way of a suitable sensor system on the combine harvester, the onset of a tilted position during the harvesting operation is sensed in a step 41, the magnitude of which is determined and stored. After this step 41, the actual loss levels of the separation process and the cleaning process are determined in a subsequent step 42 on the basis of sensor-based detection and evaluation of parameters that are characteristic therefor.

Depending on the loss levels determined in step 42 for the separation and cleaning processes, a decision is made in step 43 to activate the control or allow it to remain inactive because the loss level of the separation process limits the performance of the harvesting process. In the latter case, the control according to step 44 remains inactive, and therefore the settings according to travel in the plane are retained.

However, if it is determined in step 43 that the loss level of the separation process is lower than the loss level defined by the operator, the control is activated. A further differentiation is made as to whether the loss level of the cleaning process during harvesting travel in the plane is already at the loss level of the cleaning process defined by the operator or is therebelow. Moreover, it is possible for only a portion of the control to be activated. This occurs in particular when the loss level of the separation process has already reached the limit value or is close to the limit value, and the loss level of the cleaning process has already exceeded the limit value thereof. In this case, only a portion of the downhill flaps 20 is closed, and the uphill flaps 20 are opened.

Another embodiment of the separating device 6 is shown in FIG. 5, comprising at least one spreading roller 30, which is disposed axially parallel thereto. The at least one spreading roller 30 is disposed in the lower region of the axial separating device 6 in such a way that it can pivot about a pivot axis 32. The pivot axis 32 is disposed on a wall 31 that is parallel to the axial separating device 6. In the case of a single-rotor axial separating device 6, spreading rollers 30 are disposed on both sides of the axial separating device 6, to permit the distribution of the partial flow that is output to be influenced depending on the tilt of the combine harvester. Operation is achieved by varying the rotational speed and the inclination angle, with respect to the axial separating device 6, of the particular spreading roller 30.

In a two-rotor axial separating device (not shown in FIG. 5), at least one more additional spreading roller 30 can be disposed between the two separating rotors in order to influence the output of the particular partial flow. The at least one spreading roller 30 can extend at least partially across the axial expansion of the axial separating device 6. A configuration of a plurality of spreading rollers 30, one behind the other, is also feasible, each of which acts upon the partial flow output of individual segments of the axial separating device 6.

FIG. 6 shows another embodiment of an axial separating device 6 comprising pivotable flaps 33 disposed on both sides of the axial separating device 6. As described above, the flaps 33 are hinge-mounted by way of pivot axes 32 at the walls 31 that bound the axial separating device 6 toward the outside. Flaps 33 are likewise pivotably disposed between the two-rotor axial separating device 6. Depending on the incline, the flaps 33 are pivoted in the direction of the particular separating rotor. Consequently, chambers form on the downhill side of the axial separating device 6, in which crop collects temporarily. This provides that the passability of the separating grates 10 is manipulated in such a manner that a greater local concentration of the output partial flow on the cleaning device can be obtained on the uphill side.

FIG. 7 shows another embodiment of an axial separating device 6 comprising guide elements 39 disposed in the circumferential direction. The guide elements 39 are depicted in a closed position using solid lines. In the closed position the guide elements influence the emergence of the partial flow from the separating device. The guide elements 39 are depicted in an opened position facing away from the separating grate 10 using dashed lines.

FIG. 8 shows the return pan 12. The return pan is disposed downstream of the axial separating device 6. At least two guide plates 22, 23 are disposed at a distance from each other on the return pan 12. The two guide plates 22, 23 extend axially parallel to the longitudinal axis of the axial separating device 6 and are both disposed on the return pan 12 such that they can pivot about a pivot axis 24 extending axially parallel to said longitudinal axis. The placement of the at least two guide plates 22, 23 on the return pan 12 is selected such that each one is disposed adjacent to one of the outer sides of the return pan 12.

The guide plates 22, 23 are actuated preferably pneumatically depending on the incline in order to redirect the crop that is output by the axial separating device 6 from the downhill side toward the uphill side. By way of the position of the guide plate 22 on the downhill side, the outer, downhill section 25 of the return pan, on which crop output by the axial separating device 6 accumulates due to the incline α, is deflected at least onto the directly adjacent section 26. However, the position of the uphill guide plate 23 causes the crop output by the axial separating device 6 to be fed to the outer, uphill section 27 to a greater extent. The at least two guide plates 22, 23 also can be actuated hydraulically or electrically.

The following list of reference signs of various elements mentioned above is included (as follows), for ease of explanation:

1 conveyor device
2 threshing unit
3 cylinder
4 concave
5 guide cylinder
6 axial separating device
7 housing
8 feed device
9 ribs
9a helix
10 separating grates
11 grain pan
12 return pan
13 chute
14 blower
15 perforated floor
16 guide pan
17 conveyor auger
18 guide pan
19 conveyor auger
20 cover flap
21 opening of the separating grate
22 guide plate
23 guide plate
24 pivot axis
25 downhill section
26 adjacent section
27 uphill section
30 spreading roller
31 wall
32 pivot axis
33 flap
34 chamber
39 guide element
40 starting situation: travel in the plane
41 determination of tilted position
42 determination of loss level
43 comparison
44 control is inactive
45 control is active
α inclination angle As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A combine harvester comprising a cleaning unit and an axial separating device (6) for separating a crop flow picked up by the combine harvester into a plurality of partial flows, the axial separating device (6) comprising:
   a separation surface (10) by which a partial flow composed of grain and non-grain components is fed to a cleaning unit disposed downstream of the axial separating device (6); and
   flaps (20) for manipulating a local concentration gradient of the partial flow that is output by the axial separating device (6);
   wherein the local concentration gradient of the partial flow is caused by the tilt of the combine harvester; and
   wherein the flaps (20) are individually controllable depending on a tilt signal from a sensor system to vary a passability of openings (21) of the separation surface (10) depending on the tilt of the combine harvester and actively even out the concentration gradient of the partial flow between a downhill side and an uphill side, with respect to the tilt.

2. The combine harvester according to claim 1, wherein the separation surface (10) separate the axial separating device (6) from the downstream cleaning unit and comprises at least two sections.

3. The combine harvester according to claim 2, wherein a passability of a particular section of the at least two sections of the separation surface (10) is varied in a circumferential direction and in a longitudinal direction.

4. A combine harvester comprising a cleaning unit and an axial separating device (6) for separating a crop flow picked up by the combine harvester into a plurality of partial flows, the axial separating device (6) comprising:
   a separation surface (10) that encloses the separating device (6) comprises at least two sections and feeds a partial flow composed of grain and non-grain components to a cleaning unit disposed downstream of the axial separating device (6); and
   flaps (20) for manipulating a local concentration gradient of the partial flow that is output by the axial separating device (6);
   wherein the local concentration gradient of the partial flow is caused by the tilt of the combine harvester; and
   wherein the flaps (20) are individually controllable depending on a tilt signal from a sensor system of the combine harvester, to vary a passability of openings (21) of the separating surface (10) in a circumferential direction and in a longitudinal direction and actively even out the local concentration gradient of the partial flow between a downhill side and an uphill side, with respect to the tilt.

* * * * *